United States Patent
Sander et al.

(10) Patent No.: US 8,217,619 B2
(45) Date of Patent: Jul. 10, 2012

(54) PORTABLE DEVICES HAVING MULTIPLE POWER INTERFACES

(75) Inventors: Wendell B. Sander, Los Gatos, CA (US); Daniel A. Warren, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/962,135

(22) Filed: Dec. 7, 2010

(65) Prior Publication Data
US 2011/0193517 A1 Aug. 11, 2011

Related U.S. Application Data

(63) Continuation of application No. 12/391,668, filed on Feb. 24, 2009, now Pat. No. 7,868,582, which is a continuation of application No. 11/544,108, filed on Oct. 6, 2006, now Pat. No. 7,514,900.

(51) Int. Cl.
*H01M 10/46* (2006.01)

(52) U.S. Cl. .................................................. 320/101

(58) Field of Classification Search .................. 320/101, 320/103, 112, 114, 115, DIG. 12; 136/293
See application file for complete search history.

(56) References Cited

U.S. PATENT DOCUMENTS

| | | | |
|---|---|---|---|
| 5,420,496 A | 5/1995 | Ishikawa | |
| 6,081,104 A * | 6/2000 | Kern | 320/101 |
| 7,442,077 B2 * | 10/2008 | Peress et al. | 439/505 |
| 7,514,900 B2 * | 4/2009 | Sander et al. | 320/101 |
| 7,868,582 B2 * | 1/2011 | Sander et al. | 320/101 |
| 2001/0043050 A1 * | 11/2001 | Fisher, Jr. | 320/101 |
| 2005/0253560 A1 | 11/2005 | Popescu-Stanesti et al. | |
| 2006/0273757 A1 * | 12/2006 | Naguib | 320/107 |
| 2007/0069684 A1 | 3/2007 | Ramsden | |

FOREIGN PATENT DOCUMENTS

TW 200742912 11/2007

OTHER PUBLICATIONS

Yan Hong Lim, et al., "Simple Maximum Power Point Tracker for Photovoltaic Arrays", Electronics Letters, May 25, 2000, vol. 36, No. 11, 2 pp.
Eftichios Koutroulis, et al. "Development of a Microcontroller-Based, Photovoltaic Maximum Power Point Tracking Control System", IEEE Transaction on Power Electronics, vol. 16, No. 1, Jan. 2001, pp. 46-54.
D.P. Hohm, et al., "Comparative Study of Maximum Power Point Tracking Algorithms", Progress in Photovoltaics: Research and Applications, Nov. 22, 2002, pp. 47-62.
Joe-Air Jiang, et al., "Maximum Power Tracking for Photovoltaic Power Systems", Tamkang Journal of Science and Engineering, 2005, vol. 8, No. 2, pp. 147-153.

* cited by examiner

*Primary Examiner* — Edward Tso
(74) *Attorney, Agent, or Firm* — Kramer Levin Naftalis & Frankel LLP

(57) ABSTRACT

Portable devices having multiple power interfaces are described herein. According to one embodiment of the invention, a portable electronic device includes, but is not limited to, a processor, a memory coupled to the processor for storing instructions, when executed from the memory, cause the processor to perform one or more functions, a battery coupled to provide power to the processor and the memory, and a battery charging manager coupled to charge the battery using power derived from a plurality of power sources including a solar power source. Other methods and apparatuses are also described.

22 Claims, 15 Drawing Sheets

```
┌─────────────────────────┐
│ In response to an output│
│ voltage from a solar    │
│ power source (e.g.,     │
│ solar cells), provide   │
│ (e.g., using a booster  │
│ regulator) a regulated  │
│ power to an electronic  │
│ load (e.g., a battery/  │
│ battery charger of a    │
│ portable electronic     │
│ device).                │
│          701            │
└─────────────────────────┘
            │
            ▼
┌─────────────────────────┐
│ Monitor an amount of    │
│ power (e.g., voltage or │
│ current into a load with│
│ known characteristics)  │
│ drawn by the electronic │
│ load                    │
│          702            │
└─────────────────────────┘
            │
            ▼
┌─────────────────────────┐
│ In response to the power│
│ monitored, adjusting    │
│ the regulation (e.g.,   │
│ controlling a pulse     │
│ width modulator of the  │
│ booster regulator) of   │
│ the power provided to   │
│ the electronic load).   │
│          703            │
└─────────────────────────┘
```

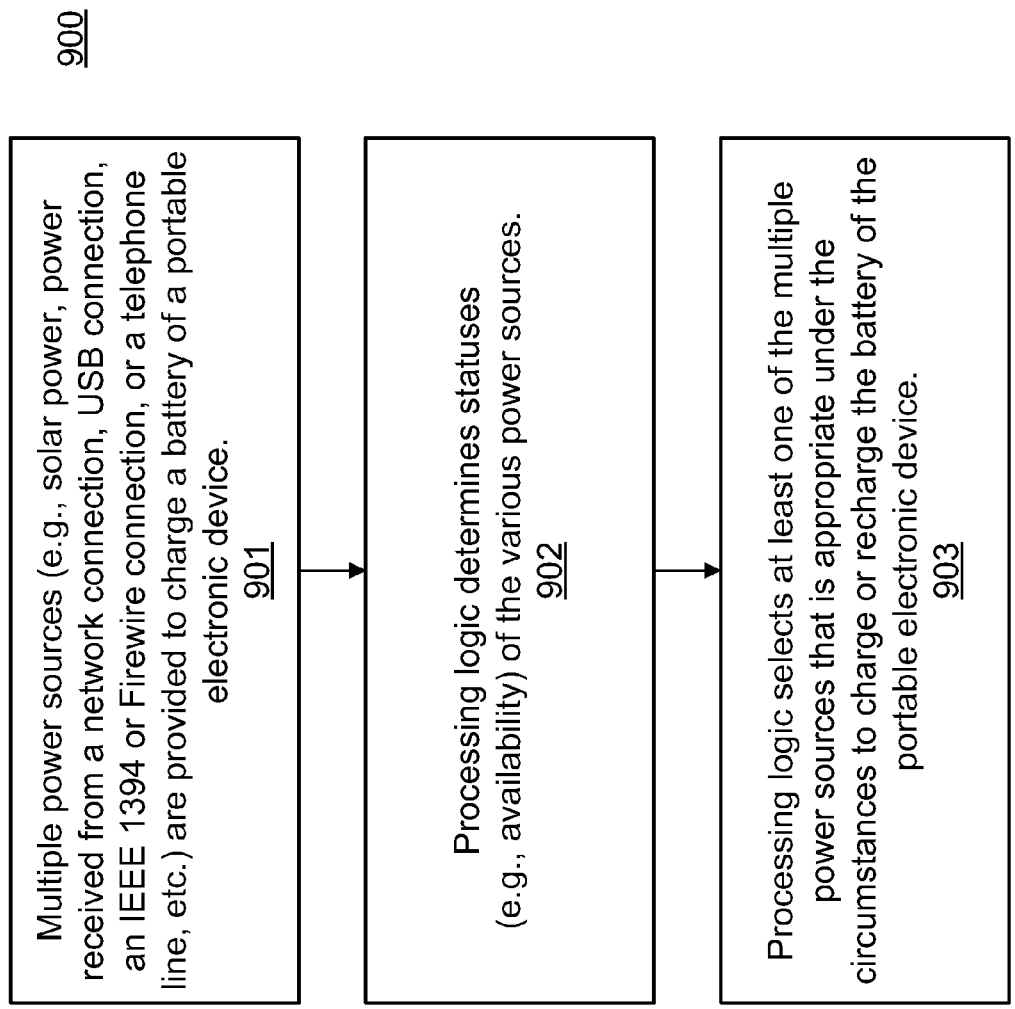

PORTABLE DEVICES HAVING MULTIPLE POWER INTERFACES

FIELD OF THE INVENTION

The present invention relates generally to portable electronic devices. More particularly, this invention relates to portable electronic devices having multiple power interfaces.

BACKGROUND

Handheld computing devices typically use standard battery chemistries including ni-cad, lithium-ion, and nickel-metal hydride. In order to recharge these batteries, operators may use standard recharging options such as, for example, conventional AC (alternating current) outlets. However, mobile users who are in remote locations oftentimes do not have access to conventional AC outlets. As a result, they oftentimes have no way of recharging the batteries of their handheld computing devices.

Recently, solar power has been used to power up a handheld device. As demands for the power of the handheld computing devices increase, it becomes more important to provide stable power to the devices. However, given the characteristics of the solar cells that provide solar power, it is relatively difficult to track the solar power drawn from the solar cells to maintain relatively stable solar power output.

FIG. 1A is a diagram illustrating a model circuit of a typical solar cell. As shown in FIG. 1A, the I-V equation for the diode part of the model can be written as follows:

$$I_D = I_o e^{\frac{qV_{CELL}}{mkT}}$$

The I-V curve for the cell may be described as follows:

$$I_{CELL} = I_Q - I_o e^{\frac{qV_{CELL}}{kT}} \quad [1]$$

Similarly, the V-I curve may be described as follows:

$$V_{CELL} = \frac{kT}{q}(\ln(I_Q - I_{CELL}) - \ln(I_0))$$

For a typical cell the Cell current is about 1 Amp at 650 mV so $I_0$ can be computed to be $1.389 \times 10^{-11}$. FIG. 1B is a diagram illustrating an example of the V-I characteristic of a solar cell. The output is similar to a current limited voltage source. The power out of the cell at any given point on the V-I curve is the voltage times the current. FIG. 1B also includes a plot of the available cell power plotted as a function of voltage. As shown in FIG. 1B, there is a fairly sharp peak operating power that is the desired operating point for maximum power out.

FIG. 2A is a schematic diagram illustrating a typical solar power system using a boost switching regulator and a storage battery. Referring to FIG. 2A, the boost regulator would be used in low cell count systems where the battery voltage is larger than the available cell voltage. The boost regulator boosts the solar cell voltage to a voltage suitable for a conventional battery charger. A controller monitors the current into the battery charger and controls the current drawn by the charger to control the power draw from the solar cell. Since the output voltage is constant the power to the battery charger is proportional to the current drawn so the control be considered to be a power control and the solar cell sees the converter as a adjustable constant power load as illustrated in FIG. 2B.

FIG. 3A is a diagram illustrating a cell V-I source plot with a resistor load line and some constant power load lines. Referring to FIG. 3A, the resistor load is always stable since both the source and load resistances are positive. The constant power loads are conditionally stable. The 600 mW load is always unstable because there is no intercept with the cell V-I curve. The 400 mW and 500 mW loads are stable at the Intercept B locations because the positive conductance of the cell is greater than the negative conductance of the load. These loads are unstable at Intercept A. With the 600 mW load the load will continue to demand current that the cell cannot supply so the cell will go into constant current mode and the cell voltage will go down. This similar situation will apply to the other two loads if cell voltage is below Intercept A; however, if the cell voltage is above Intercept A, the cell voltage will increase and finally settle at Intercept B.

FIG. 3B is a diagram illustrating a SPICE simulation result that shows the behavior of the system when the load current is stepped up in 0.5 mA steps from a load current of about 75 mA. At each step the cell voltage drops by an increasing amount and when the peak power point is exceeded so there is no intercept, the system collapses. The controller in FIG. 2A must sense the impeding collapse and recover before the actual collapse occurs.

In addition, a conventional portable device or handheld device typically includes a battery and an AC adaptor for charging the battery. Certain handheld devices, such as a calculator, include a solar panel to generate solar power to activate the device. However, such a device does not normally include other power sources to charge the battery. Sometimes the solar power source or AC outlet may not be conveniently available. In such circumstances, a device limited to one charging method may not function properly.

SUMMARY OF THE DESCRIPTION

Techniques for operating devices with solar power are described herein. In one aspect of the invention, apparatus for operating a portable electronic device with solar power includes, but is not limited to, a voltage converter and a controller coupled to the voltage converter. The voltage converter includes an input capable of being coupled to a solar power source and an output capable of being coupled to an electronic load, such as, for example, a portable electronic device. The voltage converter is configured to monitor or detect an amount of power drawn by the electronic load at the output of the voltage converter. In response to the monitored power drawn, the controller is configured to control the voltage converter to adjust further output power provided to the electronic load. As a result, the output voltage from the solar power source is maintained within a predetermined range.

According to another aspect of the invention, a portable electronic device includes, but is not limited to, a processor, a memory coupled to the processor for storing instructions, when executed from the memory, cause the processor to perform one or more functions, a battery coupled to provide power to the processor and the memory, and a battery charging manager coupled to charge the battery using power derived from a plurality of power sources including a solar power source.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 7 is a flow diagram illustrating a process for operating an electronic device with solar power according to one embodiment of the invention.

FIG. 9 is a flow diagram illustrating an example of a process for interfacing a portable device with a variety of power sources according to one embodiment of the invention.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Techniques for Operating Devices with Solar Power

According to certain embodiments of the invention, an amount of power drawn at the point of a load of solar power is monitored and the monitored power is used to control a voltage converter that provides regulated power. For example, contrary to conventional approaches where the voltage of an output of a solar power source is monitored and used to control a charger to consume the solar power, the amount of power (e.g., an amount of current or voltage into a load with known characteristics) being drawn is monitored at an input of an electronic load, such as, for example, a battery or a battery charger that utilizes the solar power to charge and/or recharge the battery is monitored. Based on the monitored power drawn, a controller (e.g., a programmable microcontroller) is invoked to determine statuses of the solar power sources and to generate a control signal using a predetermined algorithm, in response to the monitored power being drawn by the electronic load. The control signal is used to control the voltage converter to adjust further amount of power to be drawn by the electronic load. The above operations may be performed via hardware, software, or a combination of both.

Figure 4A:
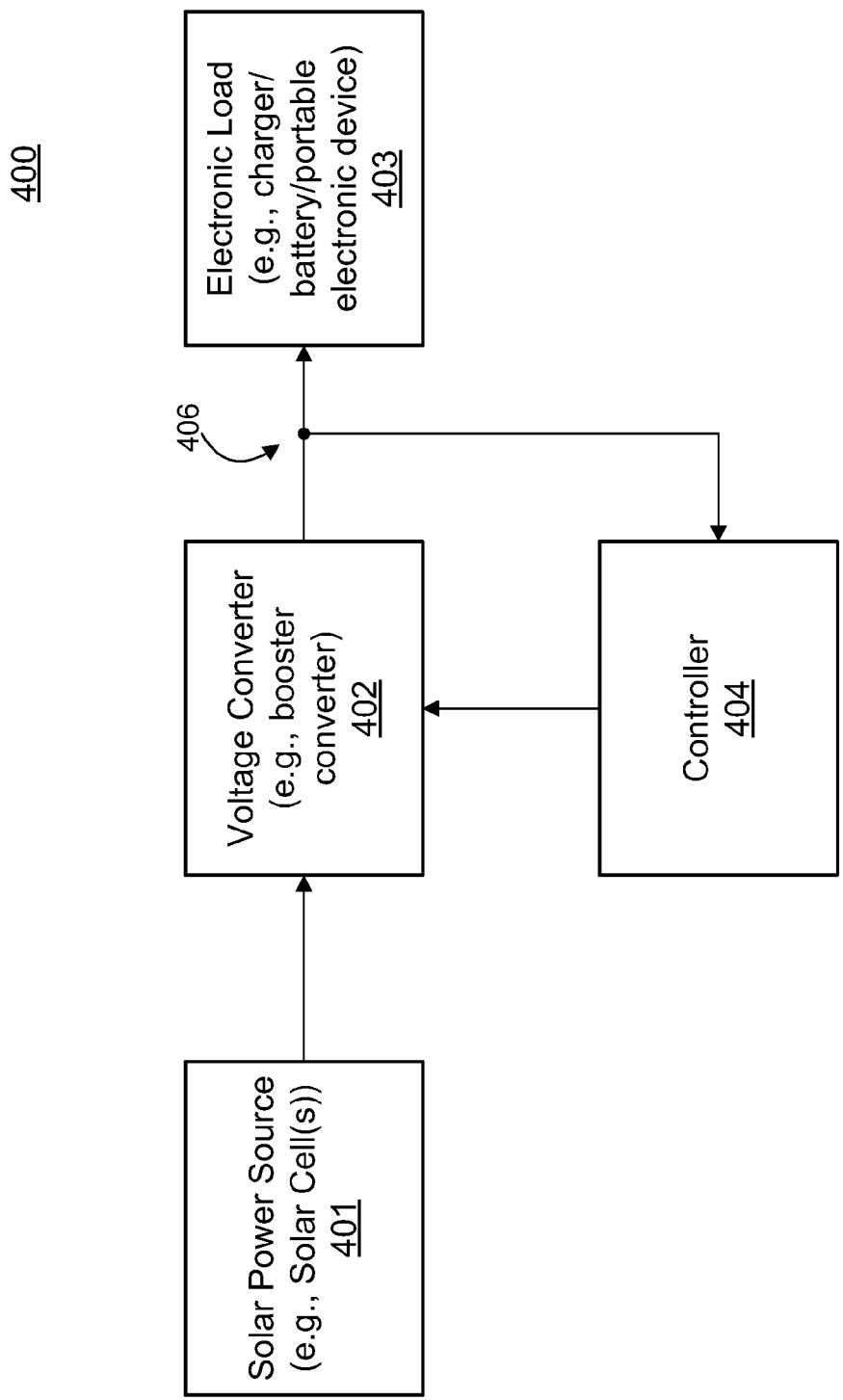
FIGS. 4A-4B are schematic diagrams illustrating systems for operating an electronic device with solar power according to certain embodiments of the invention.

FIG. 4A is a block diagram illustrating an example of an apparatus for operating an electronic device with solar power according to one embodiment of the invention. In one embodiment, the apparatus includes, but is not limited to, a voltage converter and a controller coupled to the voltage converter. The voltage converter includes an input capable of being coupled to a solar power source and an output capable of being coupled to an electronic load, such as, for example, a portable electronic device. The voltage converter is configured to monitor or detect an amount of power drawn by the electronic load at the output of the voltage converter. In response to the monitored power drawn, the controller is configured to control the voltage converter to adjust an amount of power to be drawn subsequently. As a result, the output voltage from the solar power source is maintained within a predetermined range.

Referring to FIG. 4A, exemplary circuit 400 includes a voltage converter 402 and a controller 404 coupled to voltage converter 402. An input of the voltage converter 402 is capable of being coupled to a solar power source 401, which may include one or more solar cells, or solar cell arrays. The solar power source 401 is configured to absorb energy from the light such as sun light and transform the absorbed energy into electricity. The voltage converter 402 is configured to convert the electricity from the solar power source 401 into proper form of electric power that is suitable to be used by the electronic load 403.

In addition, a controller 404 is coupled to a node 406 coupling an input of the electronic load 403 and an output of the voltage converter 402. Specifically, controller 404 is configured to monitor an amount of power being drawn from the output of the voltage converter by the electronic load 403. For example, the controller 404 may be configured to monitor an amount of current being drawn by the electronic load 403, for example, using a current sense resistor (not shown). Alternatively, the controller 404 may be configured to monitor the voltage of node 406 coupling the electronic load 403 and the voltage converter 402, or a combination of both voltage and current being drawn at node 406.

Figure 1A:
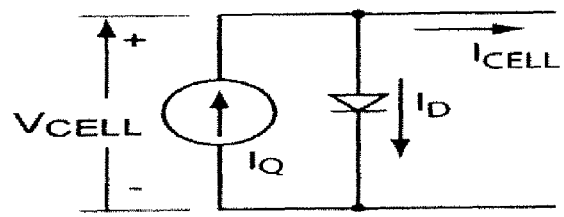
FIG. 1A is a diagram illustrating a model circuit of a typical solar cell.

In response to the monitored power being drawn, according to one embodiment, the controller 404 determines the statuses of solar power source 401. For example, based on the monitored power being drawn at node 306, the controller 404 is able to determine whether the maximum power that the solar power source 401 can generate has been reached, given the characteristic of the solar power source 401, such as, for example, characteristics similar to those shown in FIGS. 1A and 1B. Alternatively, in response to the monitored power being drawn, the controller 404 determines whether an output voltage of the solar power source 401 has dropped below a predetermined threshold in view of certain characteristics of solar power source 401.

Based on the determined statuses of the solar power source 401, according to one embodiment, the controller 404 is configured to generate a control signal to control the voltage converter 402. In response to the control signal received from the controller 404, the voltage converter 402 is configured to adjust a subsequent amount of power to be drawn by the electronic load 403, such that the output of the solar power source 401 may be maintained within a predetermined range.

Figure 5A:
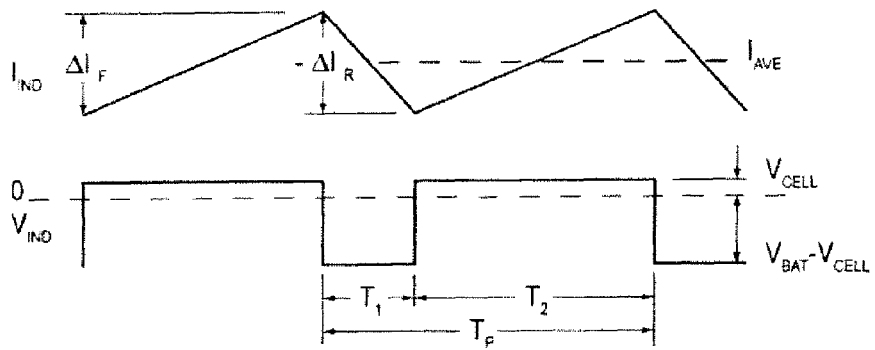
FIGS. 5A-5B are diagrams illustrating certain characteristics of circuits as shown in FIGS. 4A-4B.
Figure 5B:
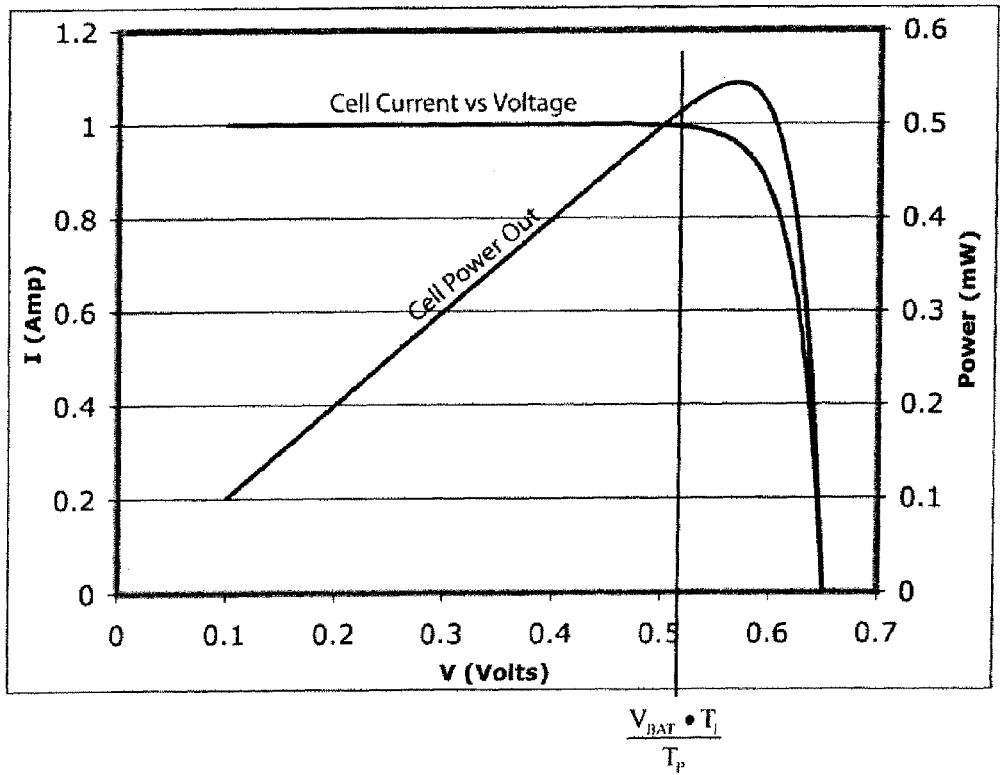

In one embodiment, the controller 404 is a programmable controller that may be programmed to perform the determination described above based on a predetermined algorithm. For example, controller 404 may include a machine-readable storage medium (not shown) to store one or more machine instructions. In response to the monitored power being drawn, the controller 404 is configured to execute the one or more machine instructions stored therein to determine the status of the solar power source 401. The one or more machine instructions may include one or more executable routines, which may be programmed and stored in the machine-readable storage medium of controller 406. The one or more routines may be used to generate the control signal based on the monitored power being drawn using a predetermined relationship between the monitored power and one or more characteristics of the solar power source 401, such as, for example, a diagram as shown in FIGS. 5A and 5B according to certain embodiments of the invention.

In one embodiment, the solar power source 401 may be integrated with the exemplary circuit 400. Alternatively, the solar power source 401 may be implemented external to the exemplary circuit 400 and is capable of being interfaced with the exemplary circuit 400. Note that solar power source 401 is used herein as an example for the purposes of illustration only. Other types of power sources may also be applied.

The electronic load 403 may include, but is not limited to, a portable electronic device, such as, for example, a notebook/laptop computer, a media player (e.g., MP3 or video player), a cellular phone, a personal digital assistant (PDA), an image processing device (e.g., a digital camera or video recorder), and/or any other handheld computing devices, or a combination of any of these devices. The electronic load 403 may further include a battery and/or a battery charger to charge or recharge the battery using the electric power generated/converted from the solar power source 401.

Similarly, according to one embodiment, electronic load 403 may be integrated with circuit 400. Alternatively, electronic load 403 may be implemented external to circuit 300 and is capable of being interfaced with the exemplary circuit 400, such as, for example, via a dedicated power interface or via a shared communication interface (e.g., network interface, etc.) Other configurations may exist.

Figure 4B:
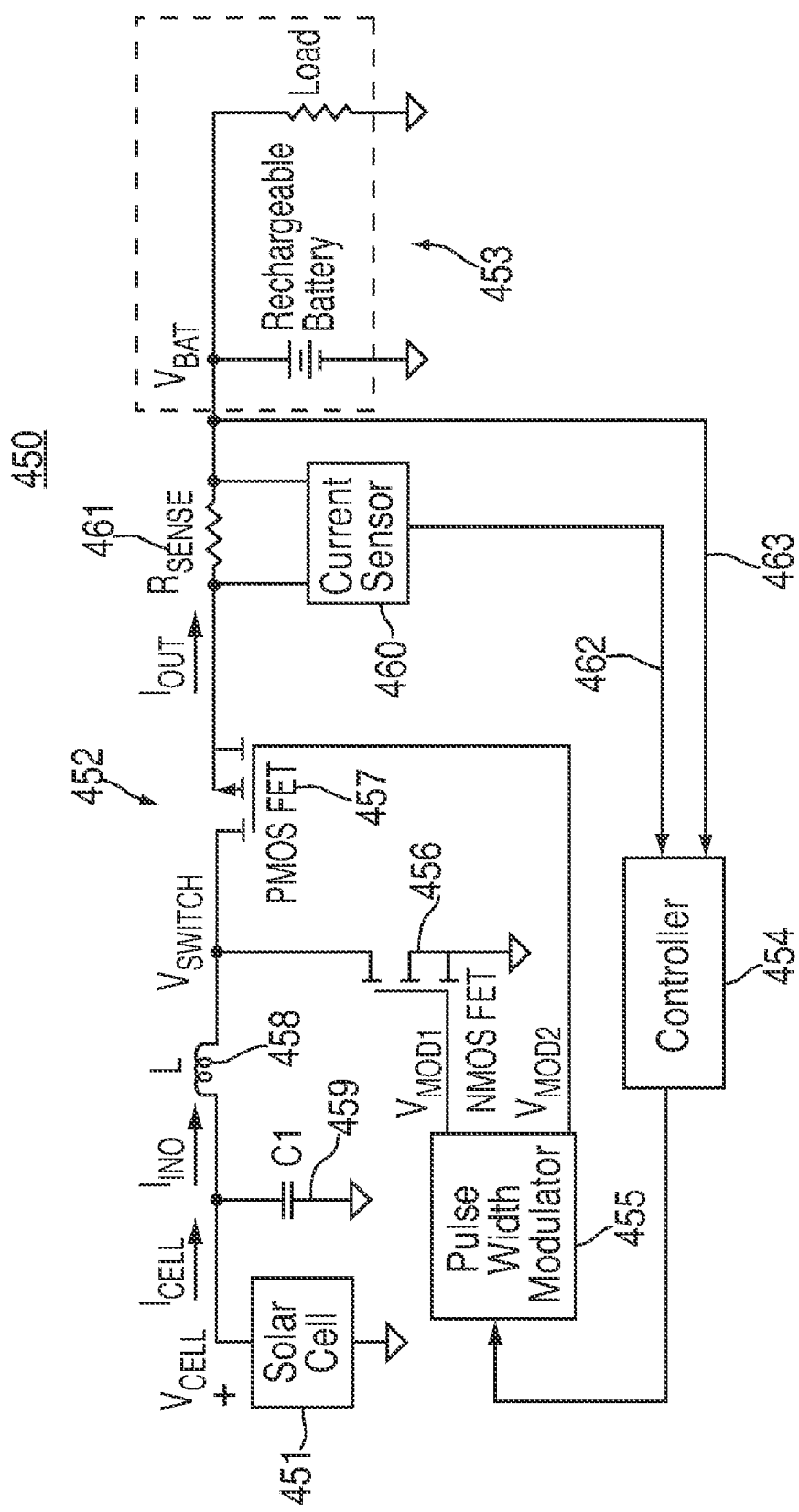

FIG. 4B is a simplified schematic diagram illustrating an apparatus for charging a battery from a solar cell, according to one embodiment of the invention. For example, exemplary circuit 450 may be implemented as an embodiment of circuit 400 of FIG. 4A.

According to one embodiment, similar to circuit 400 of FIG. 4A, exemplary circuit 450 includes, but is not limited to, a voltage converter 452 having an input coupled to a solar power source, such as, for example, solar cell or cells 451. The voltage converter 452 includes an output coupled to an electronic load 453, which may include a battery, battery charger, and/or a portable electronic device as described above. In one embodiment, voltage converter 452 includes, but is not limited to, a power switching device, in this example, having switches 456-457, and a switching regulator 455 (in this example, a pulse width modulator or PWM) to control a switching duty cycle of the power switching device (e.g., switches 456-457). Note that a switching device may be a FET (field effect transistor) or a bipolar transistor, etc. Since the PWM 455 can be implemented by digital logic or a programmed process then the PWM 455 can be contained in the controller 454.

In addition, voltage converter 452 further includes an energy storage device, in this example, an inductor 458, to store energy during a switching duty cycle. Further, exemplary circuit 450 may further include another energy storage device, in this example, a capacitor 459, to temporarily store energy derived from the solar power source 451, particularly, during an initialization phase of the voltage converter 452.

Furthermore, exemplary circuit 450 further includes an output power sensing circuit to sense the power being drawn by the electronic load 453. The sensing circuit may include a current sensing device and/or voltage sensing device. In this example, the sensing circuit includes a current sensing resistor 461 and a current sensor 460. The current sensing resistor 461 is coupled in series between an output of the voltage converter 452 and an input of the electronic load 453. Typically, current sensing resistor 461 is a relatively high precision resistor, where an amount of current flowing through the resistor 461 can be measured by measuring a voltage drop across the current sensing resistor 461, for example, by current sensor 460. Since the load is a battery the voltage of the load is constant so the power is proportional to the current. The change in power can then be used to determine that the maximum power available from the solar cell is being transferred to the load.

An output of the current sensor 460 may be input to controller 454 via path 462, where the controller 454 may generate a control signal based on the input received from current sensor 460. Controller 454 may be programmable controller (e.g., FPGA) having a machine storage medium (e.g., EEPROMs or electrically erasable programmable read-only memories, etc.) therein for storing instructions, which when executed from the machine storage medium, cause the controller to perform certain operations, including at least generating the control signal based on the current sensing information received from the current sensor 460. The operations may be implemented using a predetermined algorithm and/or according to certain information or condition stored in a lookup table within the controller.

Note that the specific algorithm employed by the programmable instructions may be tailored to or based on a specific operating environment and/or characteristics of the electronic load 453. The control signal generated from the controller 454 may be used by PWM 455 to adjust further switching duty cycles of the power switching device (e.g., switches 456 and/or 457). Optionally, output voltage may also be monitored and input to controller 454 via path 463, for example, to prevent a battery overcharged. Note that in this example, circuit does not have to include a battery charger although one could be added or the controller 454 could be programmed to manage the charging.

In a particular embodiment, switch 456 may be an n-channel MOSFET (NMOS) and switch 457 may be a p-channel MOSFET (PMOS). The NMOS and PMOS FETs act as switches that are activated by a pulse width modulator 455 such that when one switch is on, the other is off. A capacitor 459 holds the cell voltage during the brief switching times so that the cell current $I_{CELL}$ is essentially constant. The inductor 458 is used as the energy storage element for the voltage converter (e.g., a booster converter) created by the switches 456 and/or 457. The output of the switches is connected to the electronic load (e.g., a battery) through a relatively small sense resistor $R_{SENSE}$ 461 that is used with a current sense circuit 460 to the controller 454 which may be a digital control circuit with A/D converters for the current sense and/ or to monitor the battery voltage $V_{BAT}$. The $V_{BAT}$ monitor may be needed if there is a risk of battery overcharging. The controller 454 then generates the pulse width modulation timing for PWM 455. Note that exemplary circuit 450 is shown for the illustration purposes only. More or fewer components may be utilized and other configurations may also be implemented. In a particular embodiment, switching devices 456-457 may be an IRF6623 compatible power MOSFET (metal-oxide semiconductor FET), which is available from International Rectifier FIG. 5A is a diagram illustrating a timeline for the voltage across the inductor and the current through the inductor, according to one embodiment of the invention. As shown in FIG. 5A, it is assumed that there is some significant average current $I_{AVE}$ that is larger than the incremental current change $\Delta I$. Referring to FIG. 5A, when the NMOS FET (e.g., switch 456 of FIG. 4B) is on (during $T_2$), then voltage across inductor L (e.g., inductor 458 of FIG. 4B) is $V_{CELL}$ (ignoring switch drop) so that the current may increase approximately by:

$$\Delta I_F = \frac{V_{CELL} \cdot T_2}{L}$$

When the PMOS FET (e.g., switch 457 of FIG. 4B) is on (during $T_1$), then the voltage across inductor L (e.g., inductor 458 of FIG. 4B) is $V_{BAT} - V_{CELL}$ and the current change during this time is approximately:

$$\Delta I_R = \frac{(V_{BAT} - V_{CELL}) \cdot T_1}{L} = \frac{V_{BAT} \cdot T_1}{L} - \frac{V_{CELL} \cdot T_1}{L}$$

For steady state operation where $I_{AVE}$ is constant, then $$\Delta I_F = \Delta I_R \quad [2]$$

$$\frac{V_{CELL} \cdot T_2}{L} = \frac{V_{BAT} \cdot T_1}{L} - \frac{V_{CELL} \cdot T_1}{L}$$

$$\frac{V_{CELL} \cdot T_2}{L} + \frac{V_{CELL} \cdot T_1}{L} = \frac{V_{BAT} \cdot T_1}{L}$$

$$V_{CELL} \cdot T_P = V_{BAT} \cdot T_1$$

$$V_{CELL} = \frac{V_{BAT} \cdot T_1}{T_P}$$

Figure 1B:
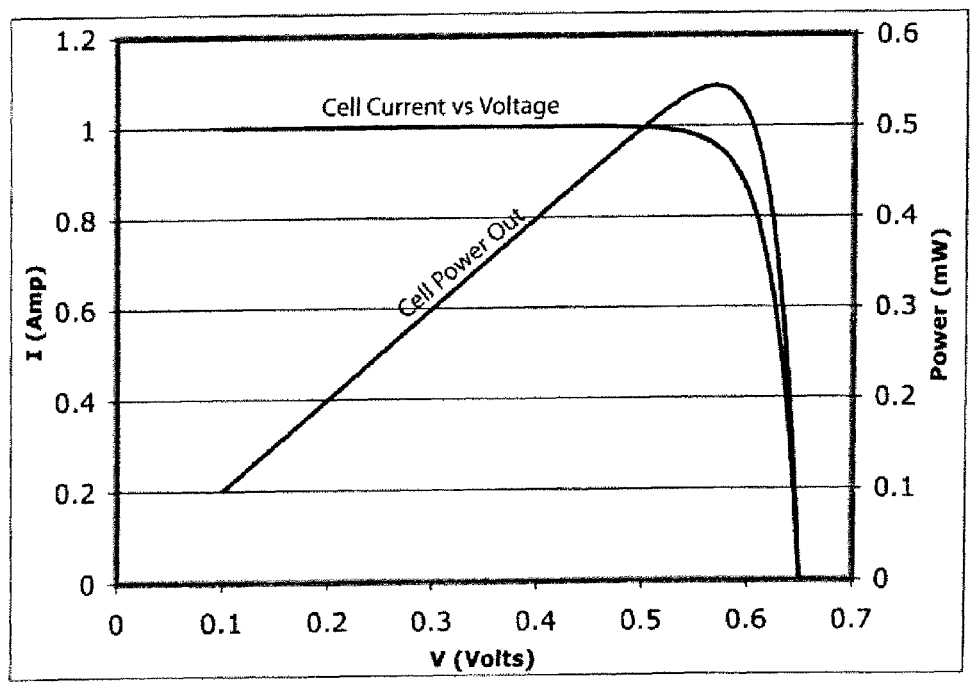
FIG. 1B is a diagram illustrating characteristics of a typical solar cell as shown in FIG. 1A.

Equation [2] states that the current will be drawn from the solar cell to satisfy the condition of FIG. 1B. This means that from Equation [1]:

$$I_{AVE} = I_{CELL} = I_Q - I_o e^{\frac{qV_{CELL}}{kT}}$$

The result is illustrated in FIG. 5B. The pulse width modulation will set a voltage operating point on the current and power curves. This is now unconditionally stable and the power peak can be found without stability concerns.

Figure 2A:
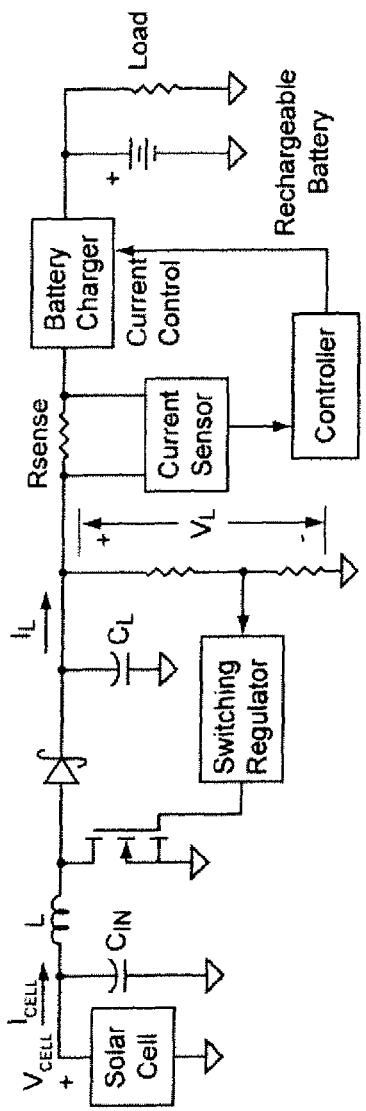
FIG. 2A is a schematic diagram of a conventional solar power circuit.
Figure 2B:
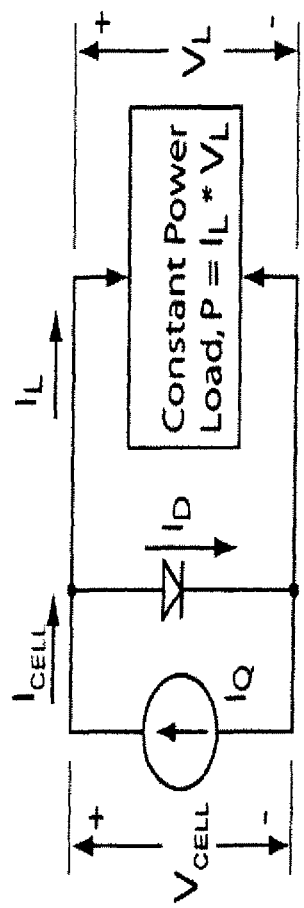
FIG. 2B is a schematic diagram of a module for a conventional solar power circuit as shown in FIG. 2A.
Figure 3A:
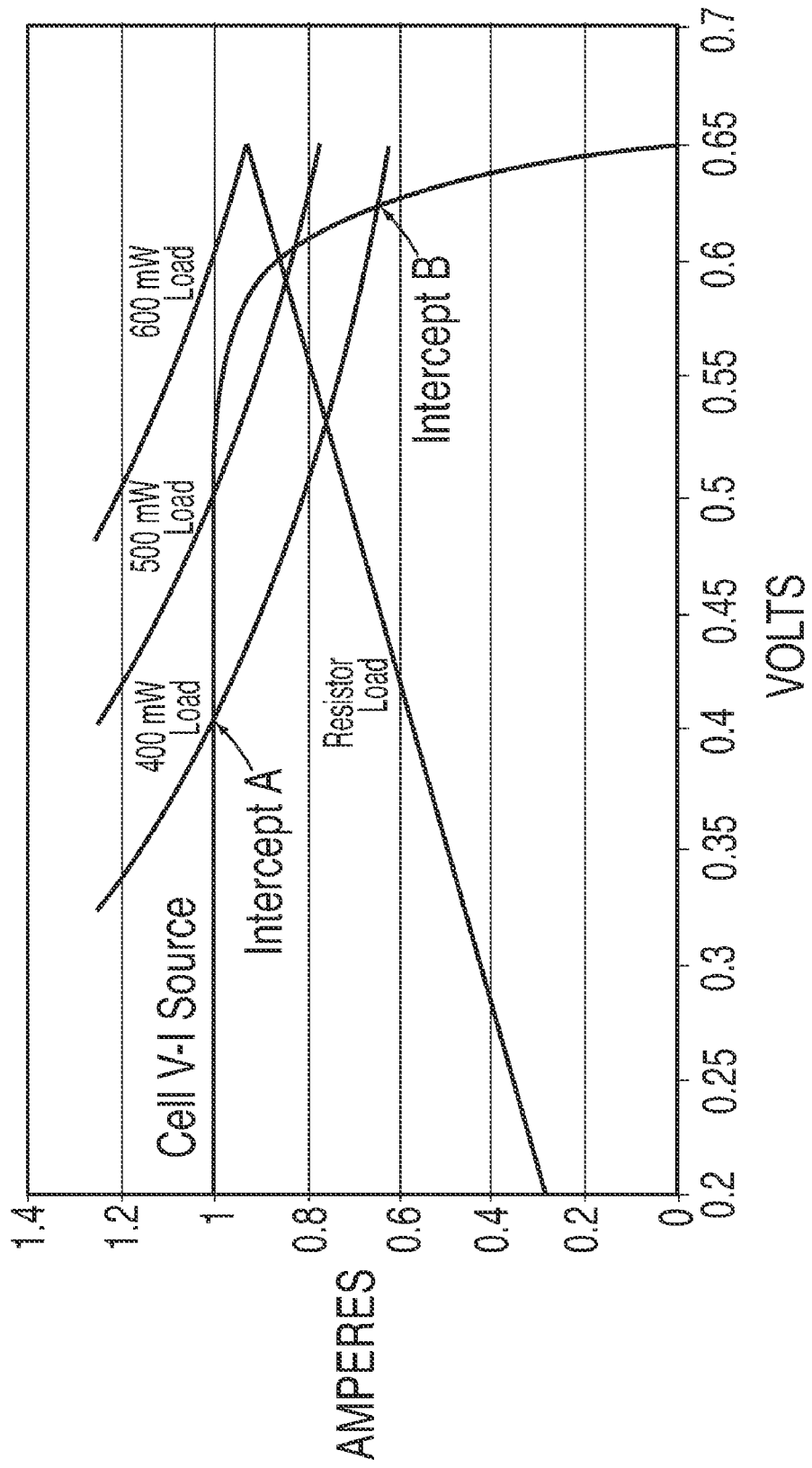
FIGS. 3A-3B are diagrams illustrating certain characteristics of circuits as shown in FIGS. 2A-2B.
Figure 3B:
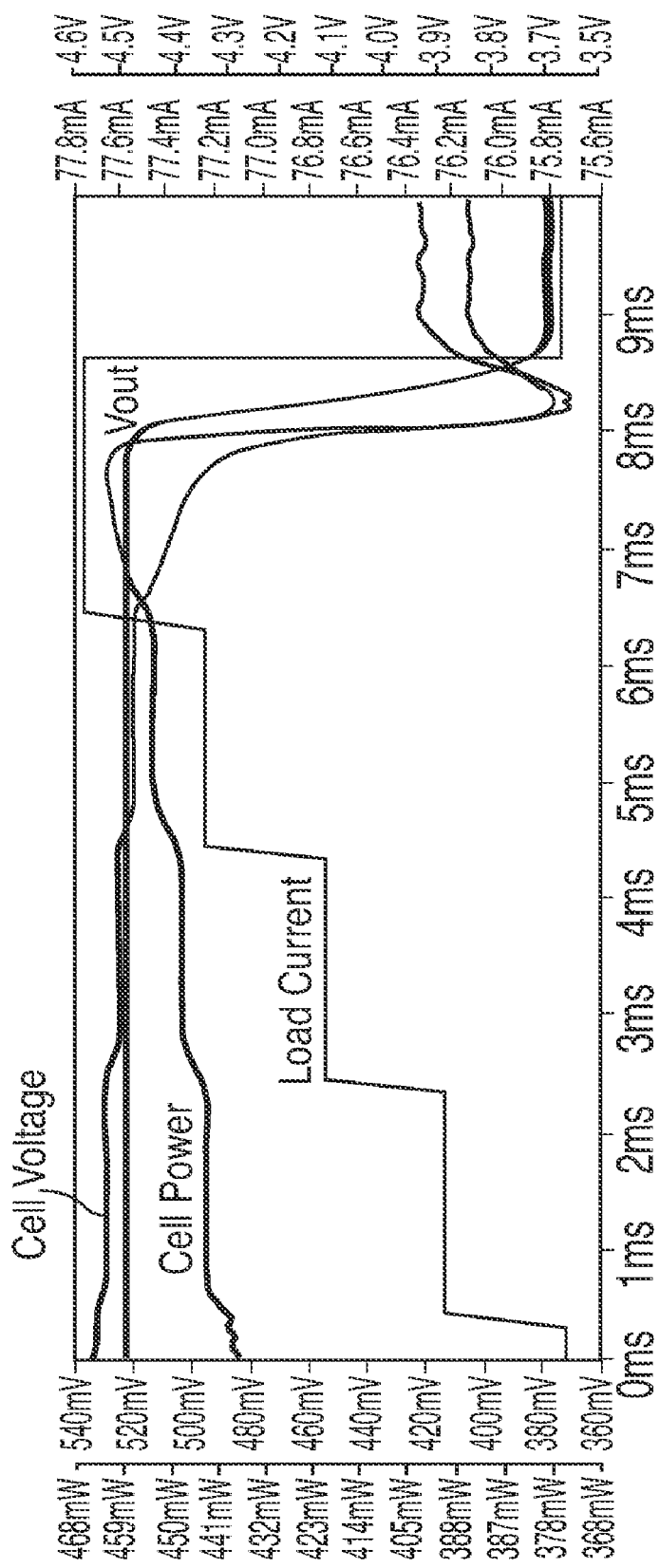
Figure 6:
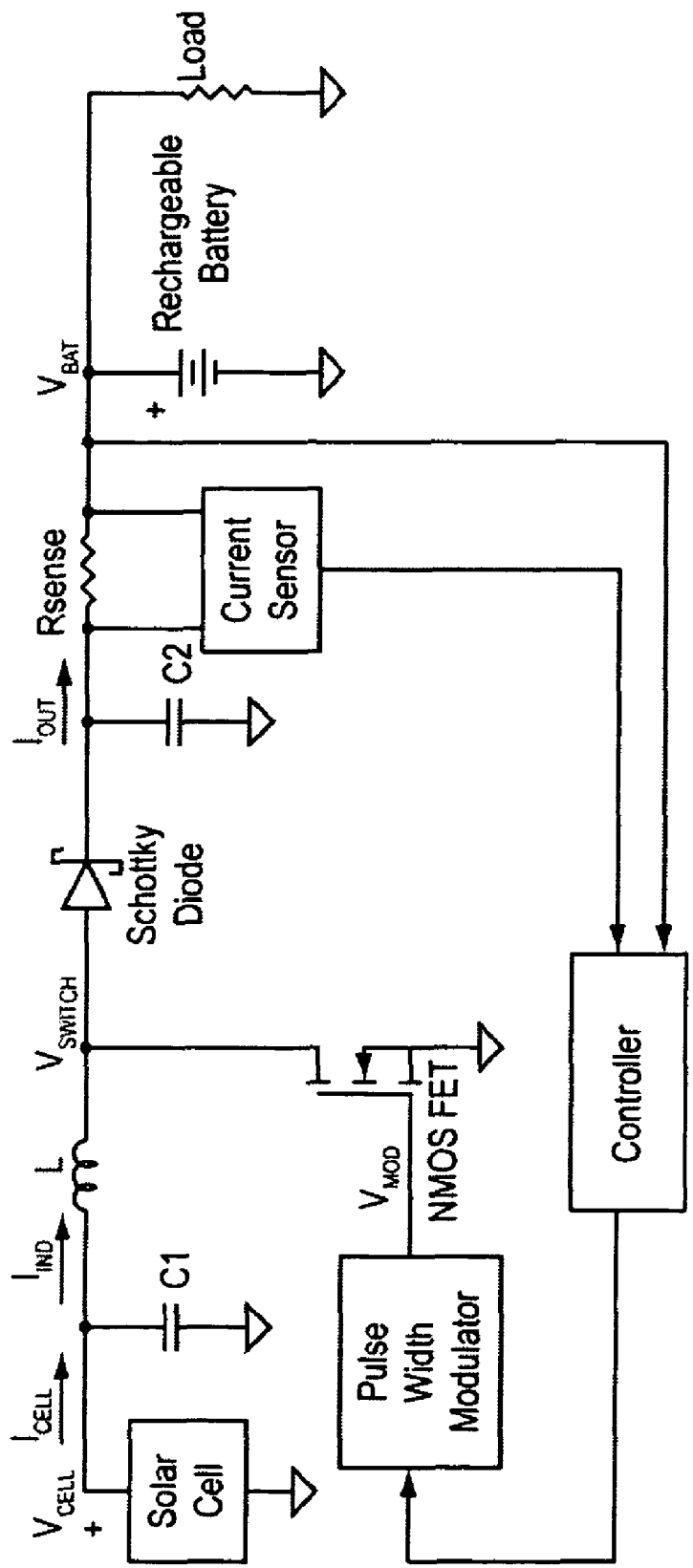
FIG. 6 is a schematic diagram illustrating a system for operating an electronic device with solar power according to an alternative embodiment of the invention.

A significant advantage of this approach is that it is more efficient than the approach of FIG. 2A, because in FIG. 2A the output voltage $V_T$ must always be higher than the maximum battery voltage and there is a power loss in the charger due to the voltage difference that will not exist in the new solution since the current goes directly into the battery. Note that any appropriate power device could be used for the switching device. For example, according to one embodiment, it is also possible for the PMOS switch to be replaced with a Schottky diode as shown in FIG. 6.

FIG. 7 is a flow diagram illustrating an example of a process for operating a portable device with solar power according to one embodiment of the invention. Exemplary process 700 may be performed by a processing logic that may include hardware (circuitry, dedicated logic, etc.), software (such as is run on a dedicated machine), or a combination of both. For example, process 700 may be performed by systems as shown in the above figures.

In one embodiment, process 700 includes, but is not limited to, generating regulated power via a voltage converter to power a portable electronic device based on solar power derived from a solar power source, monitoring power drawn at an output of the voltage converter by the portable electronic device, and in response to the monitored power, controlling the voltage converter to adjust further regulated power to the portable electronic device.

Referring to FIG. 7, at block 701, in response to an output voltage from a solar power source (e.g., a solar cell or an array of solar cells), a voltage converter (e.g., a booster converter) is configured to provide a regulated power to an electronic load (e.g., a portable electronic device, a battery, and/or a battery charger). At block 702, an amount of power (e.g., current and/or voltage into a load with known characteristics) drawn at the output of the voltage converter by the electronic load is monitored, for example, using a current sense device. At block 703, in response to the monitored power, adjusting (e.g., using a programmable controller) the regulation (e.g., controlling a pulse width modulator of the voltage converter) of the power further to be provided to the electronic load. Other operations may also be performed.

As a result, with some or all of the solar power tracking techniques, the output of the solar power source can be maintained within a consistent range and chances of a sharp drop of voltage or power output from the solar power source due to being overdrawn can be eliminated, in order to provide power to an electronic load with relatively high stability. Again, solar cells or solar cell arrays are used as examples for the purposes of illustration only. It will be appreciated that other types of power sources may also be applied.

Smart Power Interfaces

As described above, a conventional portable device typically use an AC adaptor to charge a battery of the portable device. Alternatively, a conventional portable device such as calculator utilizes a solar panel to directly power up the device. A conventional portable device lacks a flexible and smart power interface that can provide power to the portable device from multiple different power sources, including an AC/DC power and solar power sources.

According to one embodiment, a portable electronic device includes a power interface that can provide power to the portable electronic device from a variety of different power sources based on the operating circumstances of the portable electronic device. According to certain embodiments of the invention, a portable electronic device may draw power from a traditional AC/DC power, solar power, power from a variety of communication lines (such as, for example, a network connection (e.g., Ethernet), a USB (universal serial bus) connection, or an IEEE 1394 compatible connection, also referred to as Firewire), a telephone line, or a combination of any of these power sources.

Any of these power sources may be used to charge or recharge a battery of a portable electronic device. When a solar power source is utilized, one or more solar power tracking techniques described above may be utilized, for example, as a part of power management component or a battery charging manager of the portable electronic device. A battery charging manager of a portable electronic device is able to determine the operating environment of the portable electronic device and the availability of the various power sources. In response, the battery charging manager may select one or more of the power sources that are appropriate under the circumstances to be used to charge a battery of the portable electronic device.

In one embodiment, a portable electronic device, which can draw power from a variety of power sources, may be a notebook/laptop computer, a media player (e.g., an MP3 or video player), a cellular phone, a personal digital assistant (PDA), an image processing device (e.g., a digital camera or video recorder), and/or any other handheld computing devices, or a combination of any of these devices (e.g., a combo device).

FIGS. 8A-8D are block diagrams illustrating examples of portable electronic devices having a power interface for various power sources, according to certain embodiments of the invention. In one embodiment, a portable electronic device includes, but is not limited to, a processor, a memory coupled to the processor for storing instructions, when executed from the memory, which cause the processor to perform one or more functions, a battery coupled to provide power to the processor and the memory, and a battery charging manager coupled to charge the battery using power derived from a plurality of power sources including a solar power source.

Figure 8A:
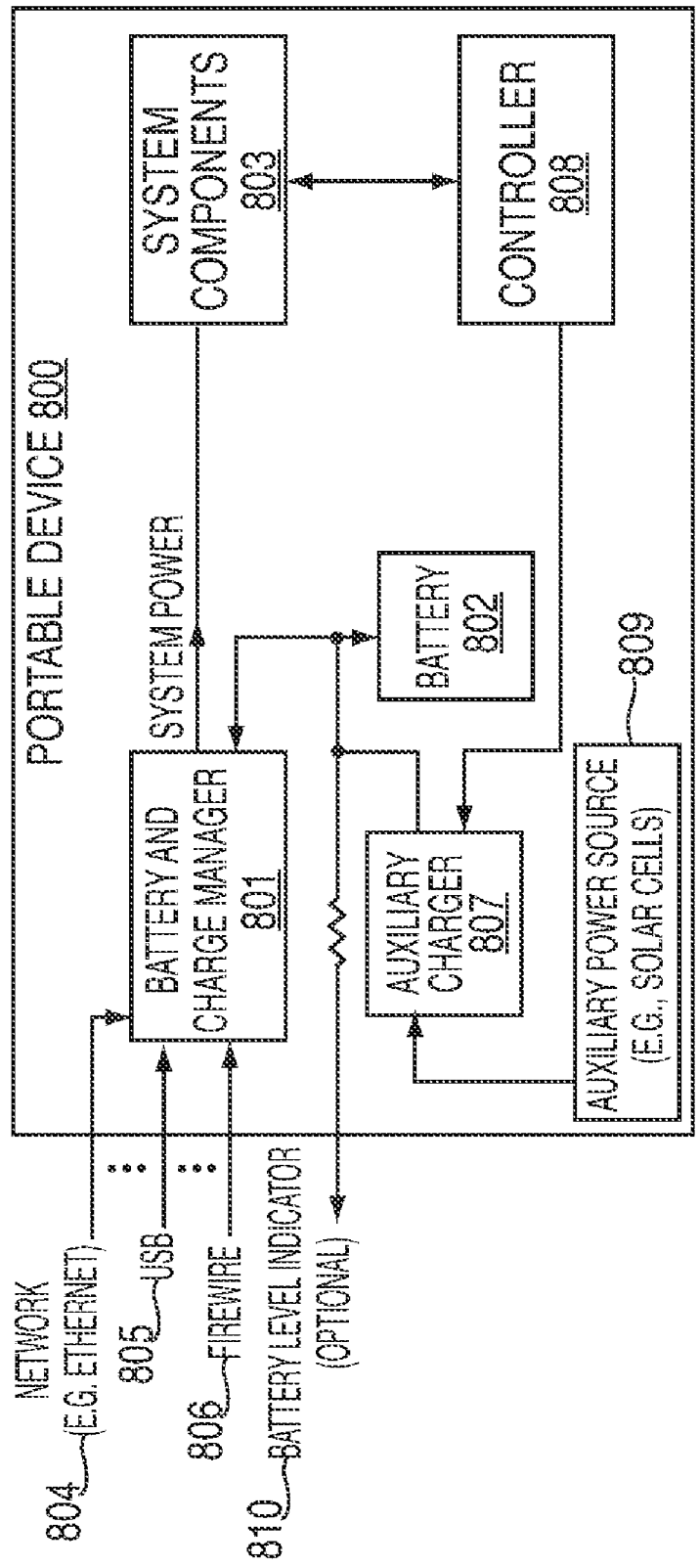
FIGS. 8A-8D are block diagrams illustrating examples of portable electronic devices having a power interface for various power sources, according to certain embodiments of the invention.

Referring to FIG. 8A, in this embodiment, portable device 800 includes, a battery charging manager 801 to manage power to be supplied to one or more system components 803. The system components 803 may include major components of a portable electronic device mentioned above. When AC power is available, power manager 801 may draw power directly from the AC power (not shown) to provide power to system components 803. Meanwhile, the power manager 801 may distribute a portion of the AC power to charge or recharge battery 802. When the AC power is not available, the battery charging manager 801 may enable the battery 802 to provide power to system components 803 for operations.

In addition, battery charging manager 801 may draw power from a variety of power sources to charge or recharge battery 802, which in turn may be used to provide power to the system components 803 subsequently or substantially concurrently. According to certain embodiments of the invention, various power sources may include power provided from a communication line or media, such as, for example, a network connection 804 (e.g., Ethernet), a USB (universal serial bus) connection 805, or an IEEE 1394 compatible connection 806, also referred to as Firewire), a telephone line (not shown), or a combination of any of these power sources.

In addition, the battery charging manager 801 may further draw power from a solar power source 809 having one or more solar cells or arrays, via the auxiliary charger 807 and/or controller 808. In one embodiment, the auxiliary charger 807 and controller 808 may be implemented using some or all of the techniques described above with respect to FIGS. 3-7.

According to one embodiment, battery charging manager 801 is configured to determine the statuses of various power sources 805-806 and 809, as well as other power sources (not shown). Based on the statuses of the power sources, the battery charging manger 801 may select one or more of the power sources, individually or substantially concurrently, to charge the battery 802.

According to certain embodiments, various external power sources (e.g., power sources 805-806) may be coupled to the portable device 800 via one or more power interface circuits. Alternatively, these power sources may be coupled to the portable device 800 using a shared interface circuit with data connection (e.g., shared network connector, USB connector, IEEE 1394 connector, or a telephone jack, etc.)

In addition, controller 808 may communicate with one or more system components 803 to further enhance the solar power charging techniques based on the operating environment or statuses of the system components 803. Further, portable device 800 may include battery level indicator 810 for indicating a current battery level to a user. Other configurations may exist.

Figure 8B:
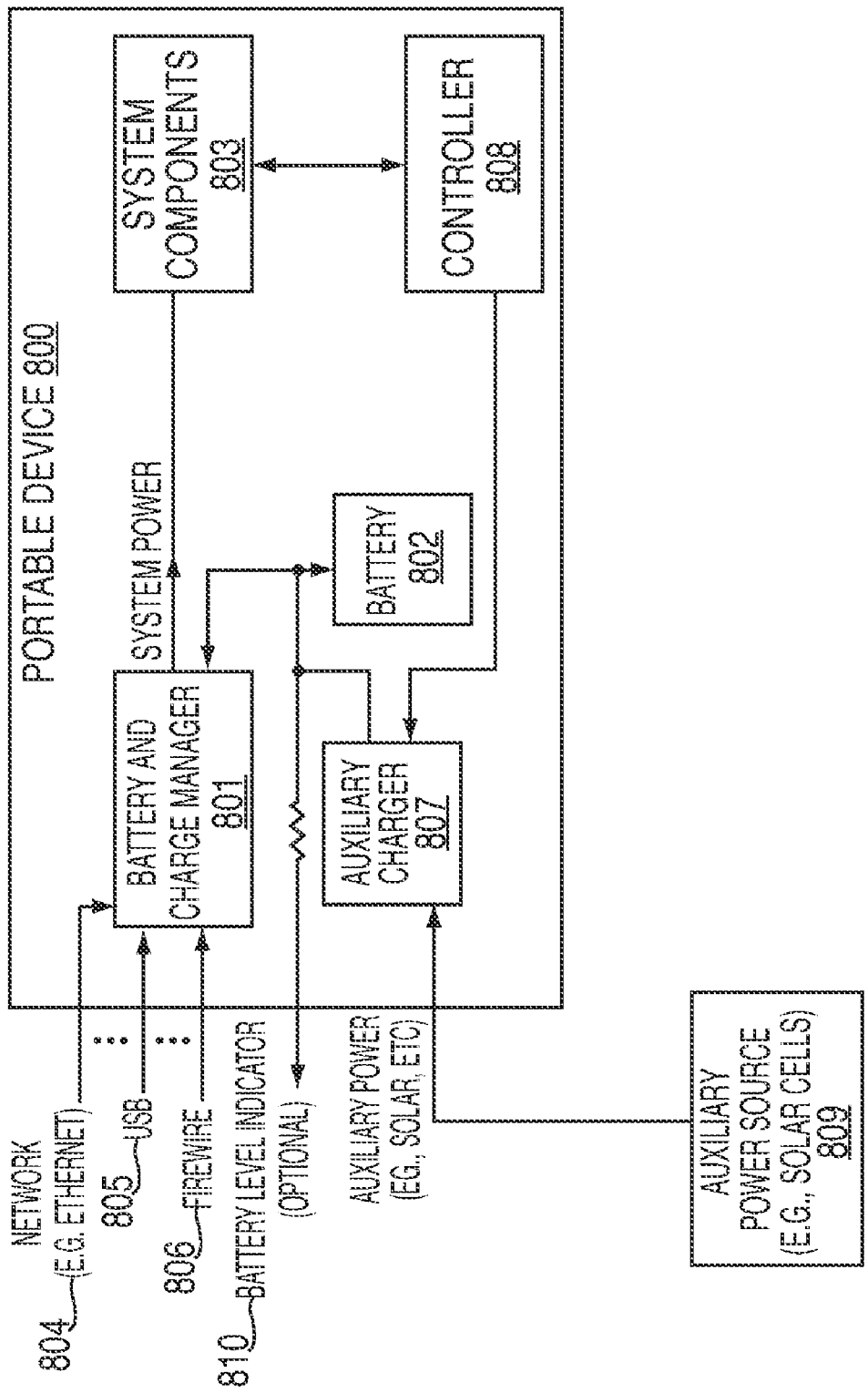

FIG. 8B is a block diagram illustrating an example of a portable electronic device according to an alternative embodiment of the invention. Unlike the embodiment as shown in FIG. 8A where the solar power source 809 is integrated within the portable device 800, in this embodiment, the solar power source 809 is external to the portable device 800. The solar power source 809 may be non-fixedly coupled to the auxiliary charger, for example, via an interface (e.g., a connector or socket). That is, the solar power source 809, which may include a solar panel having one or more solar cells or arrays, may be plugged into and removed from the portable device 800, for example, using a cable. The auxiliary charger 807 and/or controller 808 may further include plug-n-play capabilities to detect whether the solar power source 809 is inserted and whether it is appropriate to use the power drawn from the solar power source 809 to charge or recharge the battery 802. In this embodiment, the solar power source 809 may be manufactured by the same manufacturer of the portable device 800 or a third party.

Figure 8C:
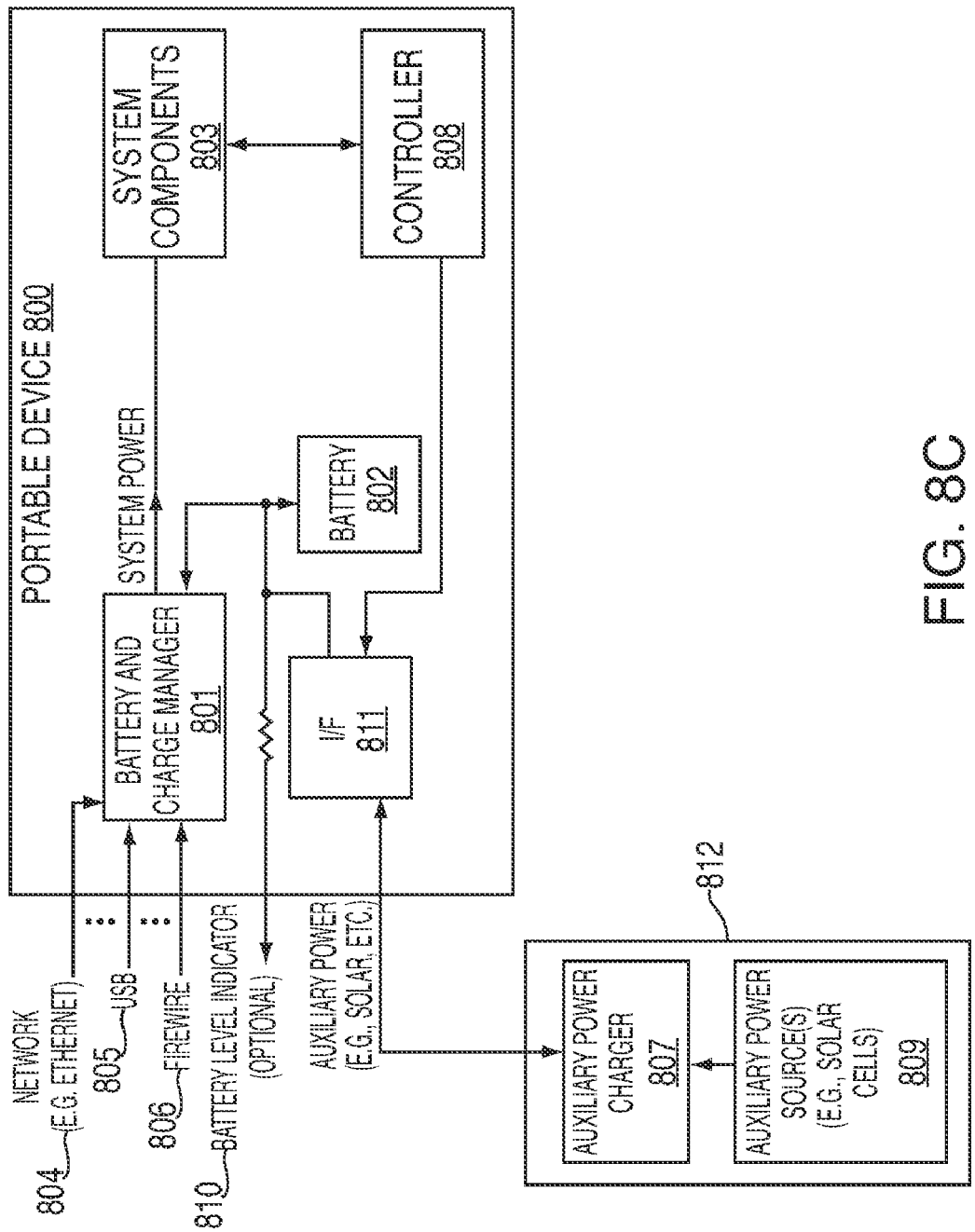

FIG. 8C is a block diagram illustrating an example of a portable electronic device according to another embodiment of the invention. Unlike the embodiments as shown in FIGS. 8A and 8B, where the solar power source 809 and/or auxiliary charger 807 are integrated within the portable device 800, in this embodiment, the solar power source 809 and auxiliary charger 807 are implemented as a power package 812 external to the portable device 800. The power package 812 becomes a portable power package that may be plugged into the portable device 800 via an interface circuit 811, for example, using a cable. Thus, the solar power source becomes an option to the portable device 800. As a result, the cost of the portable device 800 may further be reduced, since some users may not need the solar power option. Similarly, the power package 812 may be manufactured by the same manufacturer of the portable device 800 or a third party.

Figure 8D:
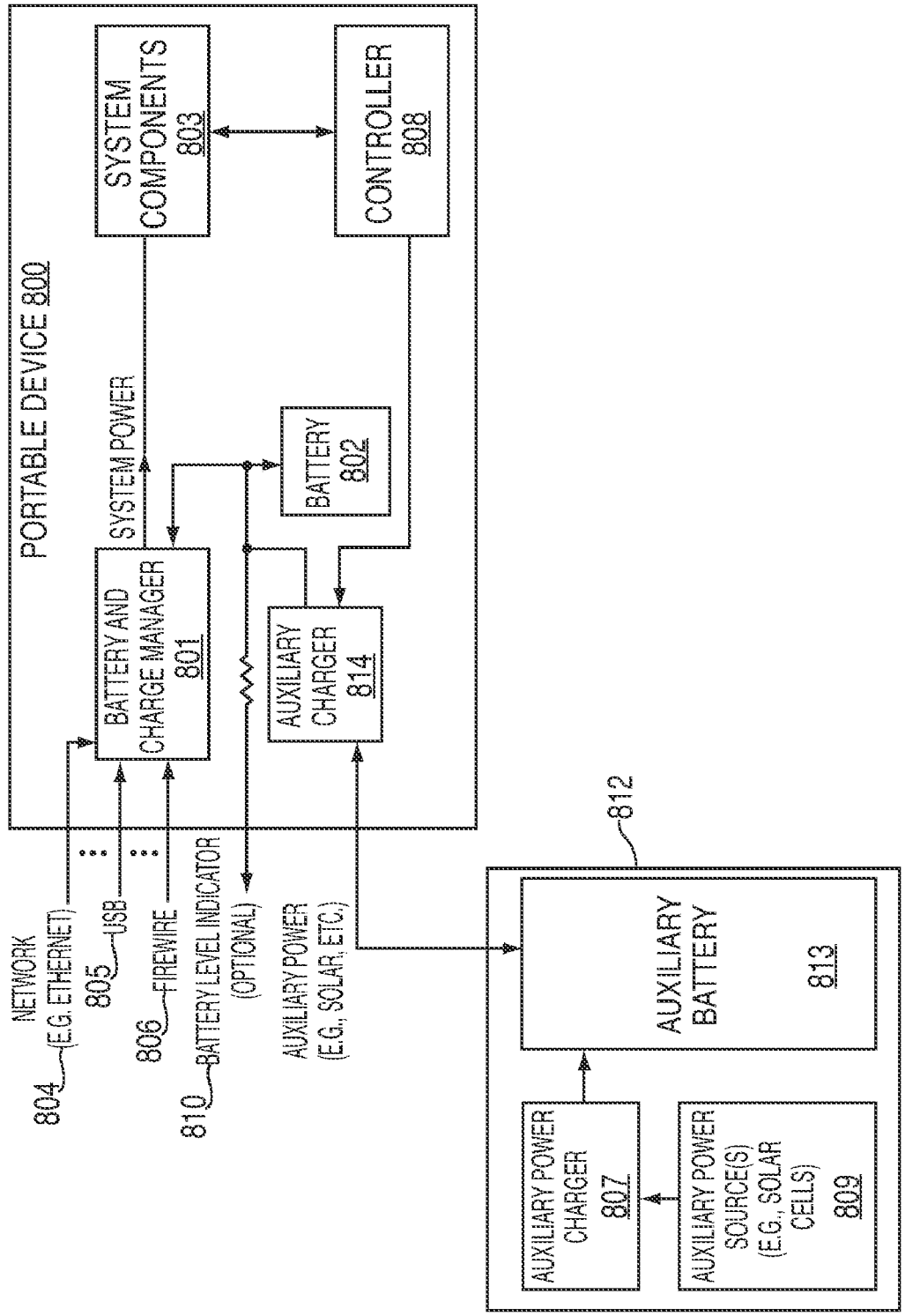

FIG. 8D is a block diagram illustrating an example of a portable electronic device according to another embodiment of the invention. In this embodiment, the power package 812 further includes a second auxiliary charger 807 and an auxiliary battery 813, while the portable device 800 maintains a first auxiliary charger 814. The power package 812 becomes a portable power package that may be plugged into the portable device 800 via an interface circuit 811, for example, with or without a cable.

In this embodiment, the auxiliary battery 813 may be charged by the second auxiliary charger 807 using power derived from the auxiliary power source, in this example, a solar panel having one or more solar cells or arrays. Thus, the auxiliary battery may be charged while the power package 812 is not coupled to the portable device 800. The charged auxiliary battery 813 may then be used to charge or recharge the battery 802, when the power package 812 is coupled to the portable device 800. Alternatively, when the power package 812 is coupled to the portable device 800 (e.g., via a cable), the auxiliary battery 813 may be charged by the second auxiliary charger 807 using the solar power derived from the solar power panel 809, while providing power to charge, via auxiliary charger 807, battery 802 substantially concurrently. Auxiliary charger 807 may be implemented with some or all of the solar power tracking techniques described above.

Similar to the embodiment as shown in FIG. 8C, the solar power package 812 becomes an option to the portable device 800. As a result, the cost of the portable device 800 may further be reduced, since some users may not need the solar power option. Similarly, the power package 812 may be manufactured by the same manufacturer of the portable device 800 or a third party.

FIG. 9 is a flow diagram illustrating an example of a process for interfacing a portable device with a variety of power sources according to one embodiment of the invention. Exemplary process 900 may be performed by a processing logic that may include hardware (circuitry, dedicated logic, etc.), software (such as is run on a dedicated machine), or a combination of both. For example, process 900 may be performed by systems as shown in FIGS. 8A-8D. In one embodiment, process 900 includes, but is not limited to, determining statuses of a plurality of power sources available to the portable electronic device, where the plurality of power sources includes a solar power source, and selecting one of the plurality of power sources to charge a battery of the portable electronic device, including selecting the solar power source when an operating environment is appropriate.

Referring to FIG. 9, at block 901, multiple power sources (e.g., solar power, power received from a network connection, USB connection, an IEEE 1394 or Firewire connection, or a telephone line, etc.) are provided to charge a battery of a portable electronic device. At block 902, processing logic determines statuses (e.g., availability) of the various power sources. In response to a given operating environment of the portable electronic device, at block 903, processing logic selects at least one of the multiple power sources that is appropriate under the circumstances to charge or recharge the battery of the portable electronic device. Other operations may also be performed.

Data Processing System Examples

Figure 10:
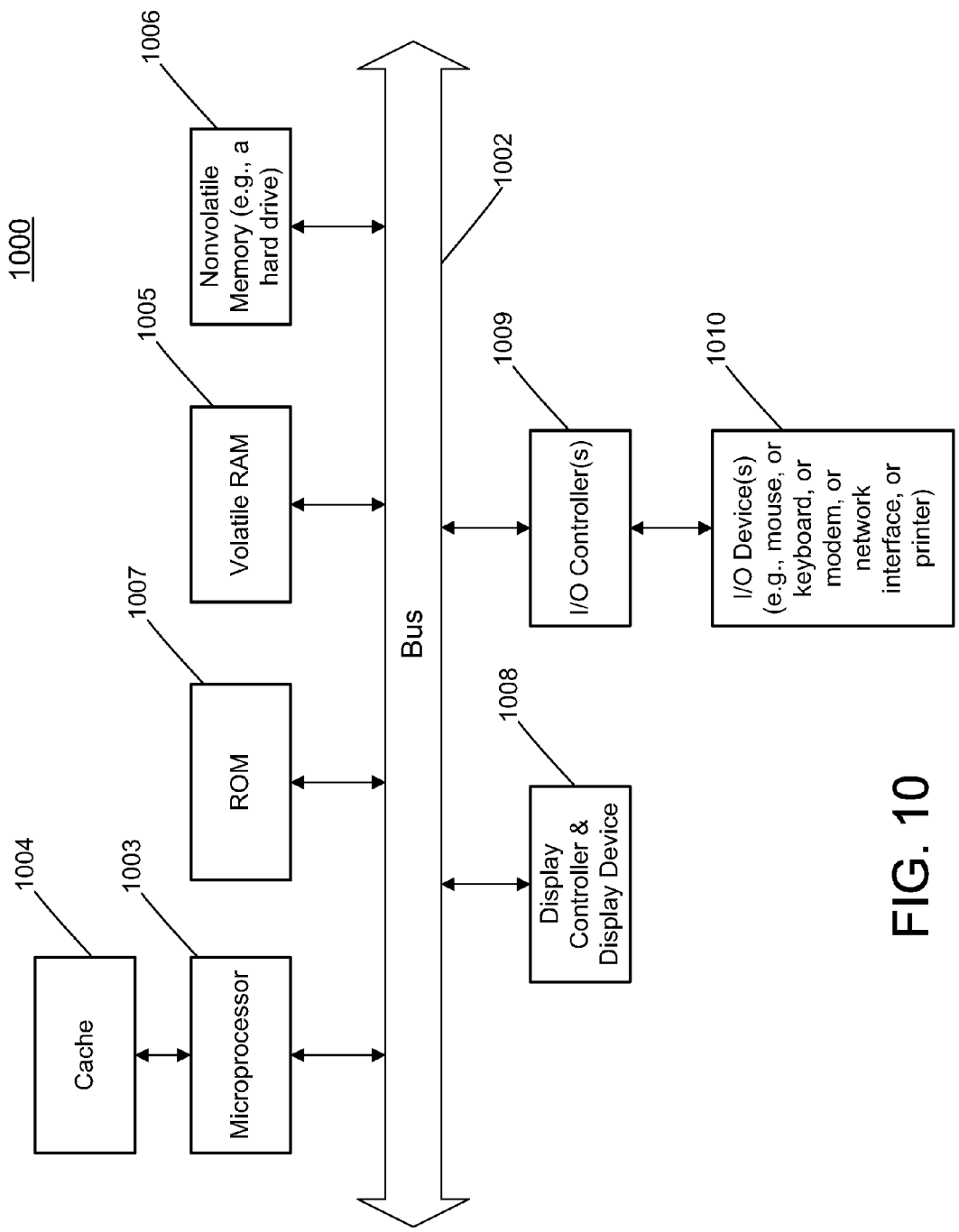
FIG. 10 is a block diagram of a digital processing system, which may be used with one embodiment of the invention.

FIG. 10 is a block diagram of a digital processing system, which may be used with one embodiment of the invention. For example, the system 1000 shown in FIG. 10 may be used as a portable electronic device as described above, which may be, for example, a notebook/laptop computer, a media player (e.g., MP3 or video player), a cellular phone, a personal digital assistant (PDA), an image processing device (e.g., a digital camera or video recorder), and/or any other handheld computing devices, or a combination of any of these devices. Further, system 1000 may include a solar power tracking mechanism and/or a power interface for various power sources described above.

Note that while FIG. 10 illustrates various components of a computer system, it is not intended to represent any particular architecture or manner of interconnecting the components, as such details are not germane to the present invention. It will also be appreciated that network computers, handheld computers, cell phones and other data processing systems which have fewer components or perhaps more components may also be used with the present invention. The computer system of FIG. 10 may, for example, be an Apple Macintosh computer or Power Book, or an IBM compatible PC.

As shown in FIG. 10, the computer system 1000, which is a form of a data processing system, includes a bus or interconnect 1002 which is coupled to one or more microprocessors 1003 and a ROM 1007, a volatile RAM 1005, and a non-volatile memory 1006. The microprocessor 1003, which may be, for example, a PowerPC G4 or PowerPC G5 microprocessor from Motorola, Inc. or IBM, is coupled to cache memory 1004 as shown in the example of FIG. 10. The bus 1002 interconnects these various components together and also interconnects these components 1003, 1007, 1005, and 1006 to a display controller and display device 1008, as well as to input/output (I/O) devices 1010, which may be mice, keyboards, modems, network interfaces, printers, and other devices which are well-known in the art.

Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a USB (Universal Serial Bus) adapter for controlling USB peripherals. Alternatively, I/O controller 1009 may include an IEEE-1394 adapter, also known as FireWire adapter, for controlling FireWire devices.

According to certain embodiments of the invention, system 1000 further include a battery (not shown) which may be charged or recharged by a solar power source (not shown) having one or more solar cells or arrays, which may be integrated with system 1000 or alternatively, external to system 1000 using some or more of the techniques described above. Further, the battery of system 1000 may be charged or recharged using power derived from a variety of power sources including, but is not limited to, a network connection (e.g., Ethernet), a USB (universal serial bus) connection, or an IEEE 1394 compatible connection, also referred to as Firewire), a telephone line (not shown), or a combination of any of these power sources. Other configurations may exist.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system comprising:
a solar power source;
a sensing unit;
an output node coupled to the sensing unit;
a regulator having first, second, and third nodes, the first node coupled to the solar power source and the second node coupled to the sensing unit; and
a controller coupled to the output node, the sensing unit, and the third node of the regulator, the controller operative to:
control operation of the regulator based on a voltage signal at the output node and a current signal detected by the sensing unit; and
maintain a peak power condition by setting a voltage operating point for the regulator.

2. The system of claim 1, wherein the solar power source comprises at least one solar cell.

3. The system of claim 1 further comprising a load coupled to the output node.

4. The system of claim 3, wherein the load comprises at least one of a battery, a battery charger, and an electronic device.

5. The system of claim 1, wherein the sensing unit comprises a current sensor.

6. The system of claim 5, further comprising a resistor coupled to the output node and a load, wherein the current sensor measures a voltage drop across the resistor to determine the current signal at the output node.

7. The system of claim 1, wherein the controller maintains the peak power condition by setting the voltage operating point for the regulator based on at least one of the voltage signal at the output node and the current signal detected by the sensing unit.

8. The system of claim 1, wherein the setting the voltage operating point for the regulator comprises generating a control signal to control the regulator to adjust a switching duty cycle of at least one switching unit.

9. The system of claim 1 further comprising an inductor coupled to the solar power source and to the regulator, wherein the regulator comprises a first switch and a second switch, and wherein the setting the voltage operating point comprises the regulator:
turning the first switch on for a first period; and
turning the second switch on for a second period.

10. The system of claim 9, wherein when the regulator turns the first switch on for the first period, a first voltage is produced across the inductor, and when the regulator turns the second switch on for the second period, a second voltage is produced across the inductor.

11. The system of claim 10, wherein:
a first incremental current is produced across the inductor in response to the produced first voltage;
a second incremental current is produced across the inductor in response to the produced second voltage; and
the voltage operating point is set when the first incremental current and the second incremental current are substantially equal.

12. The system of claim 1, wherein the controller controls operation of the regulator to maintain a charging operation of a battery charger coupled to the output node or to manage charging of a battery coupled to the output node.

13. The system of claim 1, wherein the controller comprises a programmable controlling unit.

14. The system of claim 13, wherein the programmable controlling unit comprises a field programmable gate array (FPGA) configured to execute instructions stored in the controller based on at least one of the voltage signal at the output node and the current signal detected by the sensing unit.

15. The system of claim 1, wherein the regulator further comprises at least one switching unit.

16. The system of claim 15, wherein the at least one switch unit comprises a transistor.

17. The system of claim 16, wherein the transistor comprises at least one of a FET and bi-polar transistor.

18. The system of claim 1, wherein the regulator further comprises a switching regulator.

19. The system of claim 18, wherein the switching regulator comprises a pulse width modulator, and wherein the controller controls the operation of the regulator by controlling a timing of operation of the pulse width modulator.

20. The system of claim 19, wherein the pulse width modulator is included as part of the controller in the form of at least one of digital logic circuitry and software.

21. The system of claim 1, wherein the regulator further comprises at least one capacitor configured to store energy derived from the solar power source.

22. The system of claim 1, wherein the regulator further comprises at least one inductor configured to store energy during a switching duty cycle of the regulator.

* * * * *